US012610941B2

(12) United States Patent
Song et al.

(10) Patent No.: US 12,610,941 B2
(45) Date of Patent: Apr. 28, 2026

(54) GUIDED FENCE INSTALLATION AREA DERIVATION SYSTEM THROUGH ANALYSIS OF VULNERABILITY TO HARMFUL BIRDS AND ANIMALS, AND GUIDED FENCE INSTALLATION AREA DERIVATION METHOD USING SAME

(71) Applicant: SEOUL NATIONAL UNIVERSITY R&DB FOUNDATION, Seoul (KR)

(72) Inventors: Young Keun Song, Seoul (KR); Ji Hwan Kim, Jeju-si (KR); Hee Jung Sohn, Seoul (KR); Won Hyeop Shin, Siheung-si (KR); Do Hee Kim, Yongin-si (KR); Eun Hee Park, Goyang-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 272 days.

(21) Appl. No.: 18/565,649

(22) PCT Filed: Apr. 18, 2022

(86) PCT No.: PCT/KR2022/005527
§ 371 (c)(1),
(2) Date: Nov. 30, 2023

(87) PCT Pub. No.: WO2022/255635
PCT Pub. Date: Dec. 8, 2022

(65) Prior Publication Data
US 2024/0276974 A1      Aug. 22, 2024

(30) Foreign Application Priority Data
Jun. 1, 2021    (KR) ........................ 10-2021-0071063

(51) Int. Cl.
*A01M 29/32*      (2011.01)
*B64U 20/80*      (2023.01)
(Continued)

(52) U.S. Cl.
CPC ............. *A01M 29/32* (2013.01); *B64U 20/80* (2023.01); *G03B 15/006* (2013.01); *B64U 10/13* (2023.01);
(Continued)

(58) Field of Classification Search
None
See application file for complete search history.

(56) References Cited

U.S. PATENT DOCUMENTS

| | | | |
|---|---|---|---|
| 10,782,681 B1 * | 9/2020 | Slavin | G06Q 50/10 |
| 2018/0368389 A1 * | 12/2018 | Adams | A01M 29/06 |
| 2022/0198749 A1 * | 6/2022 | Lee | G06V 20/188 |

FOREIGN PATENT DOCUMENTS

| | | |
|---|---|---|
| KR | 10-2007-0039515 A | 4/2007 |
| KR | 100858730000 B1 | 2/2009 |

(Continued)

OTHER PUBLICATIONS

Mysterud, Atle, and Christer M. Rolandsen. "Fencing for wildlife disease control." Journal of Applied Ecology 56.3 (2019): 519-525. (Year: 2019).*

(Continued)

*Primary Examiner* — David Orange
(74) *Attorney, Agent, or Firm* — Goldilocks ZONE IP LAW

(57) ABSTRACT

The present invention relates to a technology capable of efficiently deriving a place to install an induction fence intended for blocking the invasion of harmful birds and animals, wherein an optimal location may be calculated in such a manner as to calculate, with respect to animal species (Continued)

and inhabitant species shown in an area where the harmful birds and animals appear, an index for vulnerability based on image data and information resulting from analyzing environmental DNA, and to match LiDAR scanning data based on the vulnerability index.

9 Claims, 19 Drawing Sheets

(51) Int. Cl.
| | | |
|---|---|---|
| *G03B 15/00* | (2021.01) | |
| *B64U 10/13* | (2023.01) | |
| *B64U 101/30* | (2023.01) | |
| *B64U 101/32* | (2023.01) | |

(52) U.S. Cl.
CPC ...... *B64U 2101/30* (2023.01); *B64U 2101/32* (2023.01)

(56) References Cited

FOREIGN PATENT DOCUMENTS

| | | | |
|---|---|---|---|
| KR | 10-2009-0066469 | A | 6/2009 |
| KR | 101291391000 | B | 7/2013 |
| KR | 1016205920000 | B1 | 5/2016 |
| KR | 10-2016-0065240 | A | 6/2016 |
| KR | 10-2018-0131165 | A | 12/2018 |
| KR | 10-2019-0033892 | A | 4/2019 |

OTHER PUBLICATIONS

Jarvis, Laurence E., Michael Hartup, and Silviu O. Petrovan. "Road mitigation using tunnels and fences promotes site connectivity and population expansion for a protected amphibian." European Journal of Wildlife Research 65.2 (2019): 27. (Year: 2019).*

* cited by examiner

【Fig. 1】
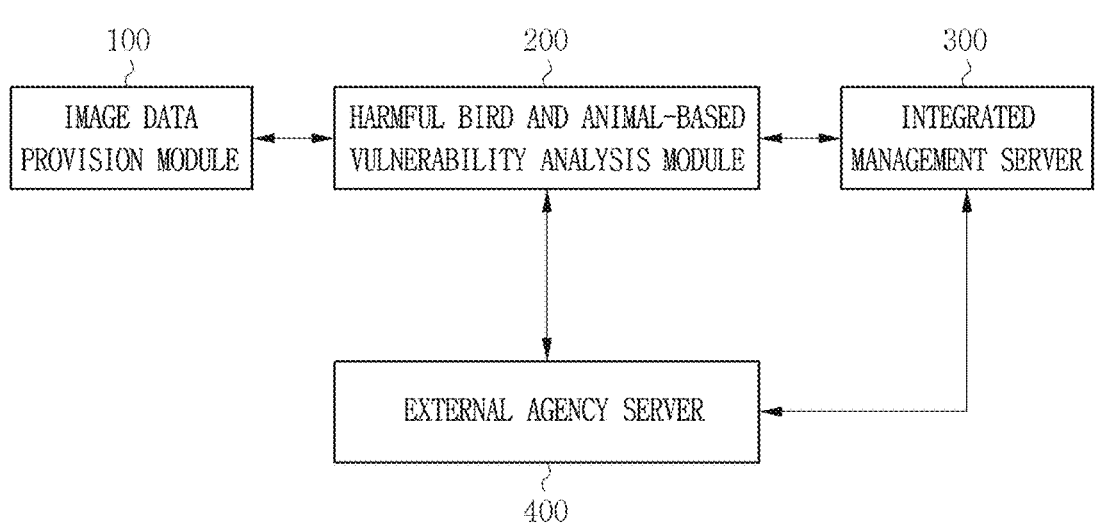

【Fig. 2】
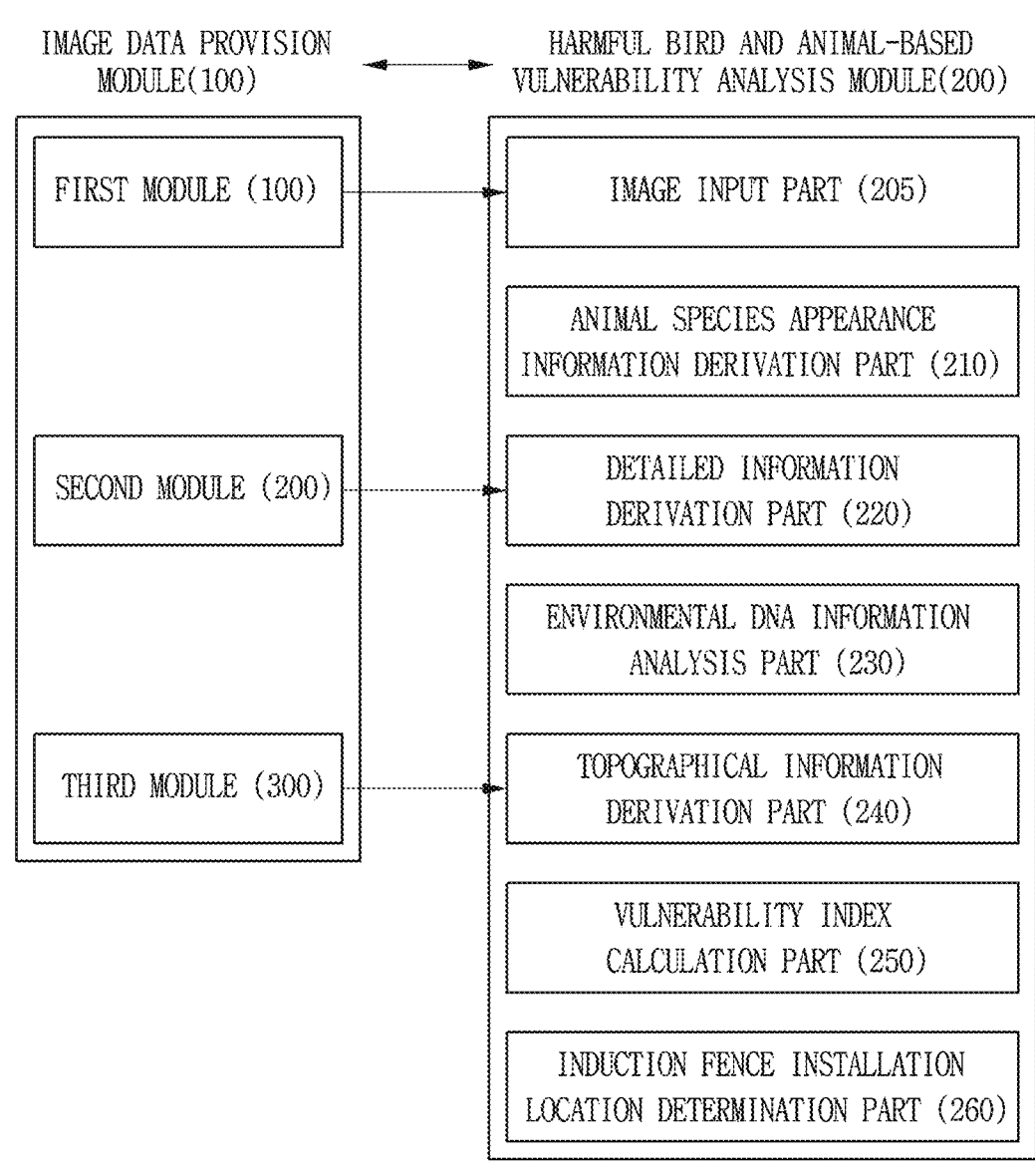

【Fig. 3】
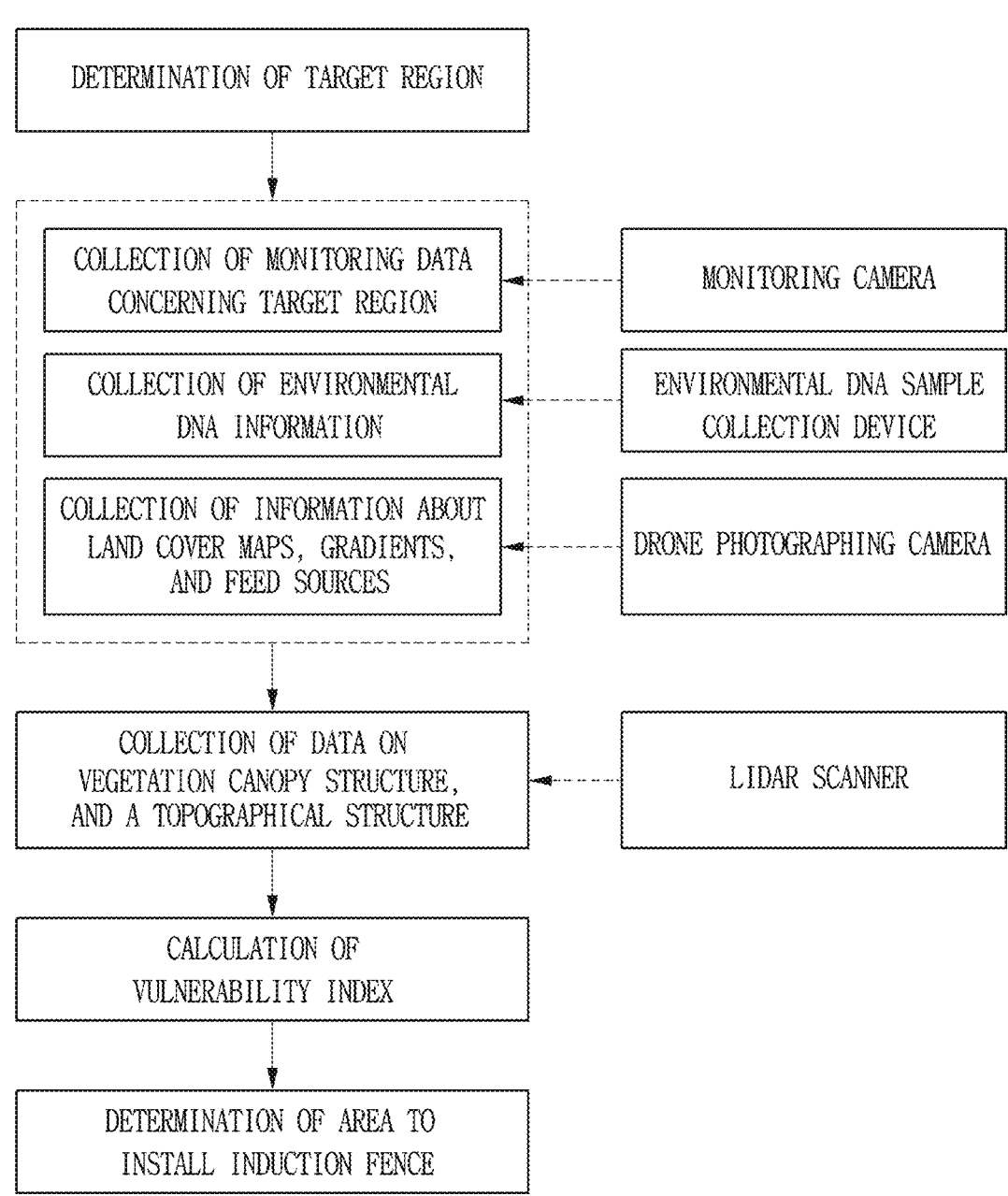

【Fig. 4】
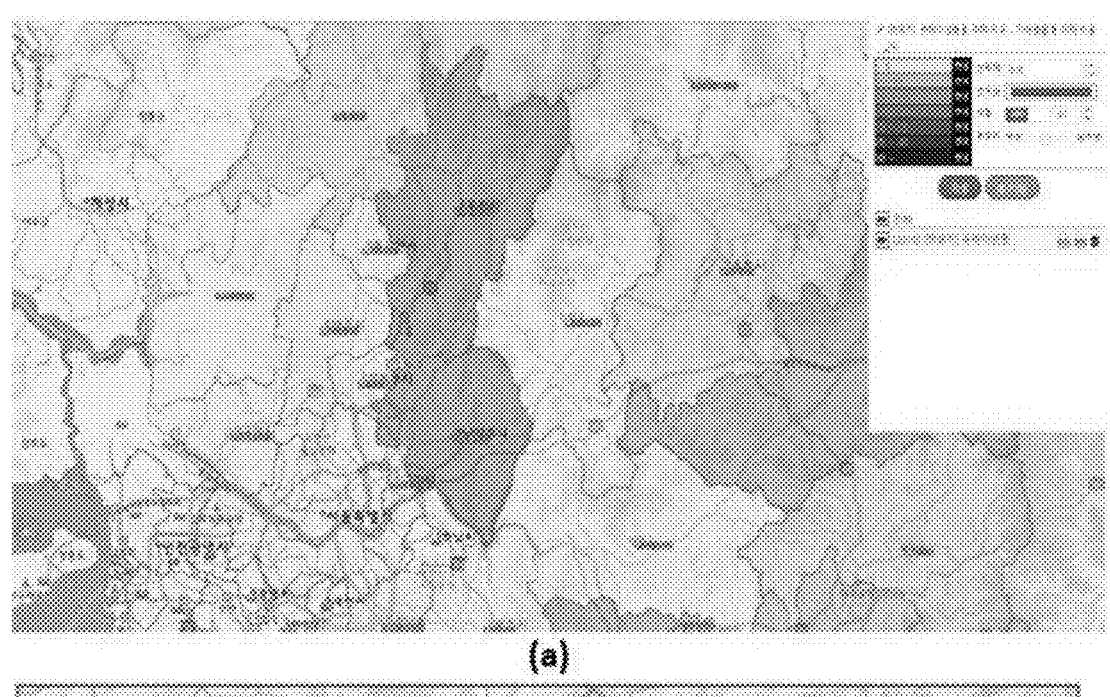
(a)
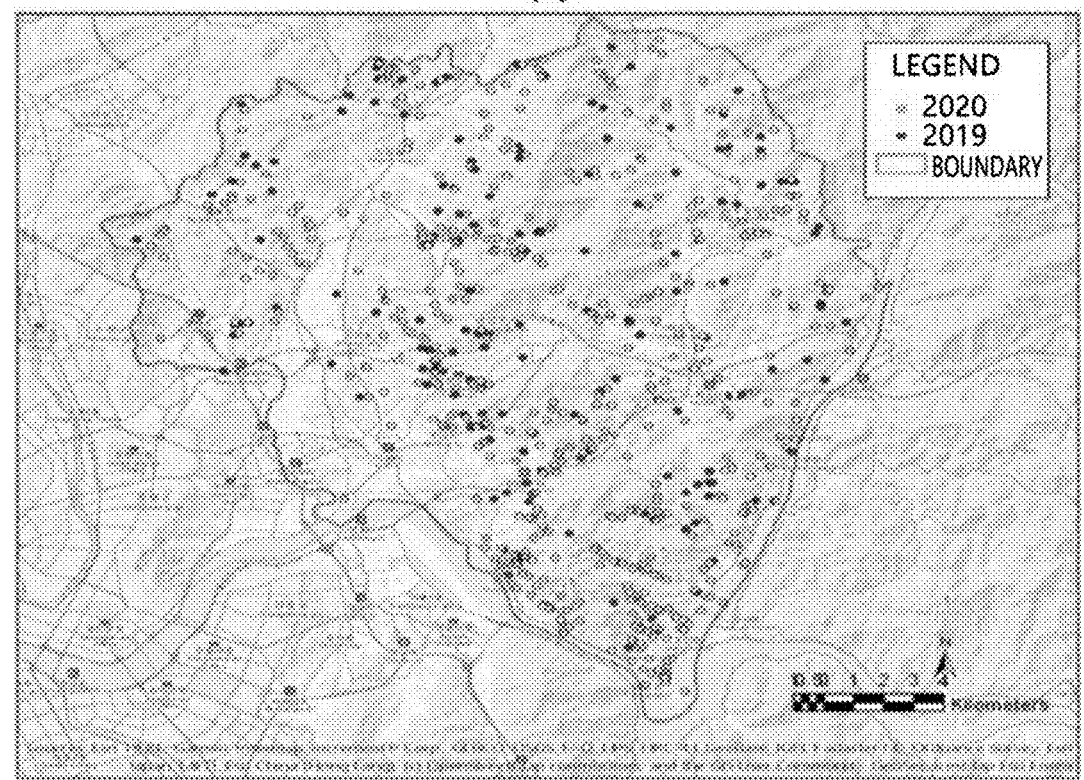
(b)

【Fig. 5A】
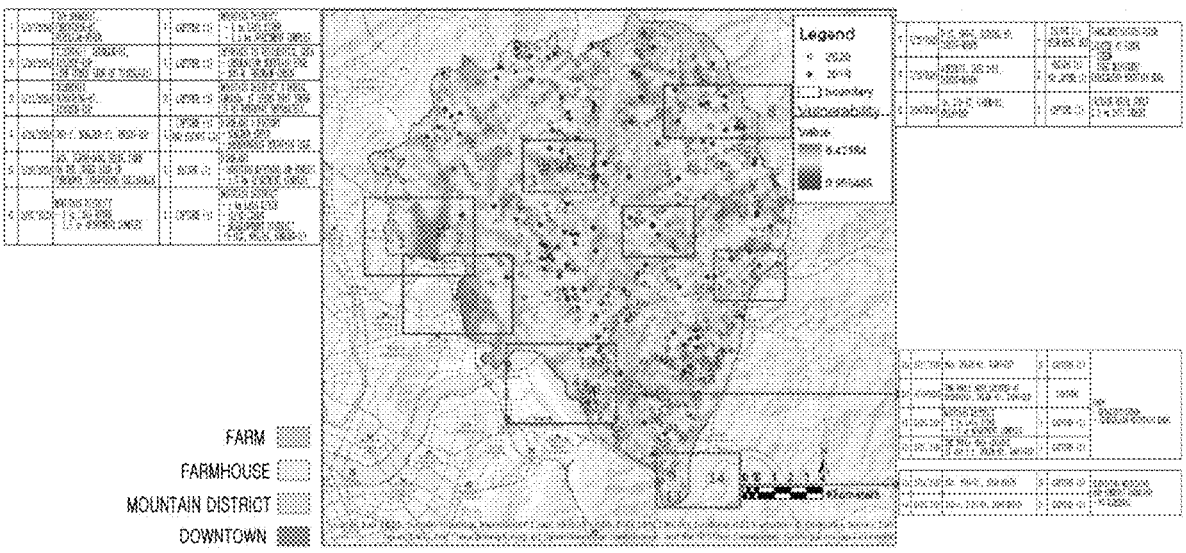

【Fig. 5B】

| 1 | 5/07/2020 | SAN-20BEONJI, CHEONGHAK-RI, BYEOLLAE-MYEON | 1 | CAPTURE (1) | MOUNTAIN DISTRICT<br>- 1 km LAVA RIVER<br>~ 1.5 km APARTMENT COMPLEX |
|---|---|---|---|---|---|
| 2 | 5/30/2020 | 721BEONJI, GEUMGOK-RI, JINJEOP-EUP (THE OTHER SIDE OF 724BEONJI) | 1 | CAPTURE (1) | APPROACH TO RESIDENTIAL AREA<br>- CHEOLMASAN MOUNTAIN EDGE<br>~ 400 M  GEUMGOK-CHEON |
| 3 | 5/11/2020 | 302BEONJI, SONGNEUNG-RI, JINGEON-EUP | 2 | CAPTURE (2) | MOUNTAIN DISTRICT A BURIAL GROUND/ IT SEEMS THAT THERE IS NO WATERWAY SEPARATELY. |
| 4 | 4/24/2020 | 360-7, NOKCHON-RI, HWADO-EUP | 1 | CAPTURE (1) AND ESCAPE (3) | FARMLAND + FACTORY<br>- NOKCHON-CHEON<br>- BAEKBONGSAN MOUNTAIN EDGE |
| 5 | 5/26/2020 | 503, ILPAE-DONG SEOUL FARM ON THE OTHER SIDE OF CHEORWON YANGPYEONG HAEJANGGUK | 1 | ESCAPE (1) | FARMLAND<br>- SURVIVING MOUNTAINS AND FORESTS<br>- 1.5 km APARTMENT COMPLEX |
| 6 | 5/07/2020 | MOUNTAIN DISTRICT<br>- 1 km LAVA RIVER<br>- 1.5 km APARTMENT COMPLEX | 1 | CAPTURE (1) | MOUNTAIN DISTRICT<br>- 1 km LAVA RIVER<br>- ILPAE-CHEON<br>- DEVELOPMENT DISTRICT<br>  (2-JIGU, WANGSUK, NAMYANG-JU) |

| 7 | 5/12/2020 | 7-20, 566-6, BIRYONG-RO, SUDONG-MYEON | - | ESCAPE (1) AFTER BEING SHOT | FARMLAND/PRIVATE HOUSE LOCATED AT GABOK<br>- CHEON<br>- UNSU MOUNTAIN/ CHEOLMASAN MOUNTAIN EDGE |
|---|---|---|---|---|---|
| 8 | 5/12/2020 | 42BEONJI, UNSU 2-RI, SUDONG-MYEON | 2 | ESCAPE (1) AND CAPTURE (1) | |
| 9 | 5/26/2020 | 18, 232-17, GABOK-RI, HWADO-EUP | 1 | CAPTURE (1) | PRIVATE HOUSE ABOUT 2.5 km 29TH STREET |

| 10 | 5/11/2020 | 903, DOGOK-RI, WABU-EUP | 2 | CAPTURE (2) | |
|---|---|---|---|---|---|
| 10 | 5/13/2020 | THE WHOLE AREA LOCATED AT 903BEONJI, DOGOK-RI, WABU-EUP | | CAPTURE | FARM<br>- GUNGCHON-CHEON<br>- JEOKGALSAN MOUNTAIN EDGE |
| 11 | 5/25/2020 | MOUNTAIN DISTRICT<br>- 1 km LAVA RIVER<br>- 1.5 km APARTMENT COMPLEX | 1 | CAPTURE (1) | |
| 12 | 5/25/2020 | THE WHOLE AREA LOCATED AT 494-1-1, DOGOK-RI, WABU-EUP | 1 | CAPTURE (1) | |

| 13 | 5/14/2020 | 352, JOAN-RI, JOAN-MYEON | 3 | CAPTURE (3) | SURVIVING MOUNTAINS AND FORESTS FARMLAND<br>- NO WATERWAY |
|---|---|---|---|---|---|
| 14 | 6/25/2020 | 443-4, JOAN-RI, JOAN-MYEON | 2 | CAPTURE (2) | |

【Fig. 6】
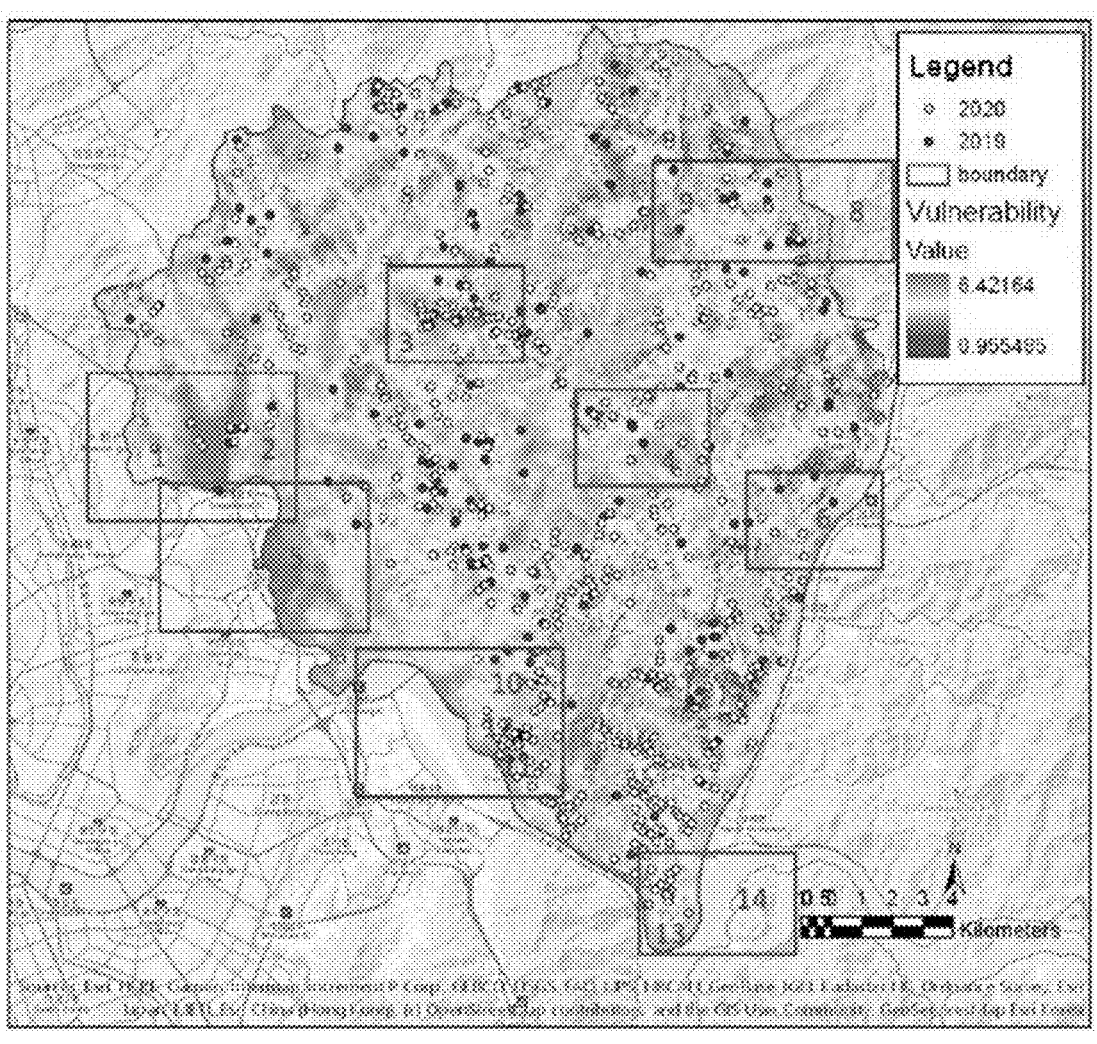

【Fig. 7】
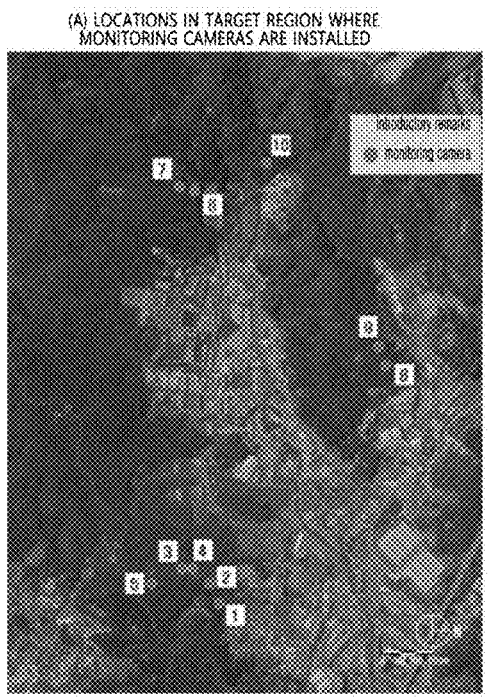
(A) LOCATIONS IN TARGET REGION WHERE MONITORING CAMERAS ARE INSTALLED
(B) PHOTOGRAPH SHOWING INSTALLATION STATE OF MONITORING CAMERA IN TARGET REGION, AND APPEARING WILD ANIMALS 【Fig. 8】
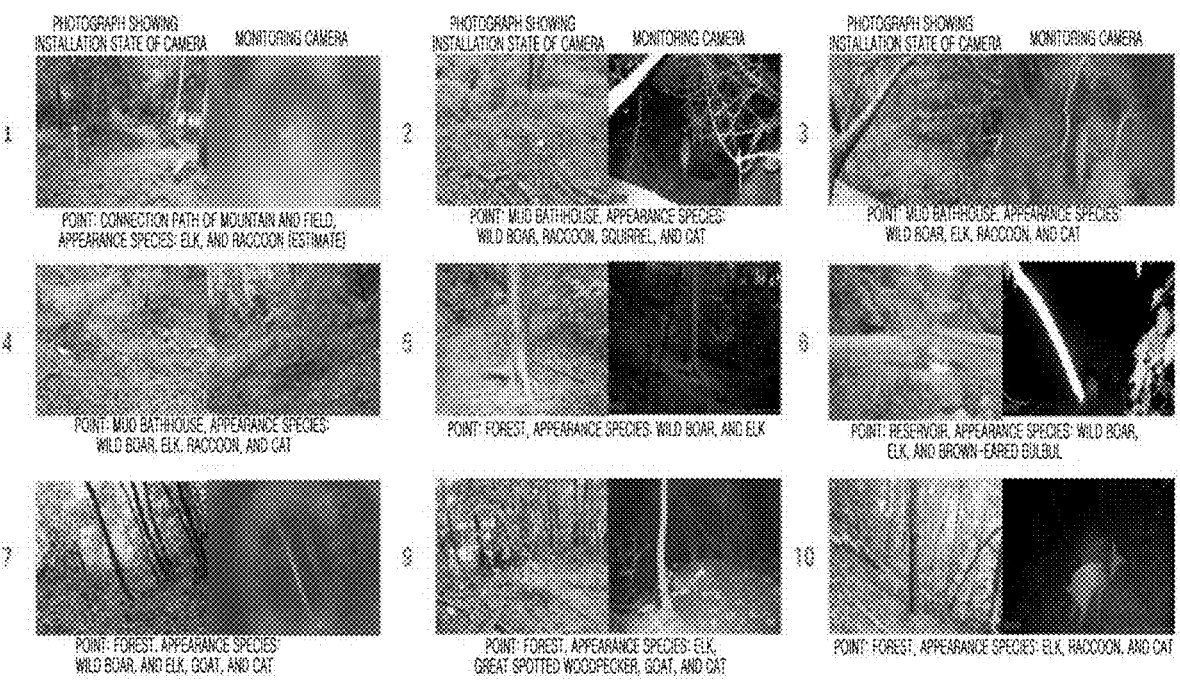

【Fig. 9】
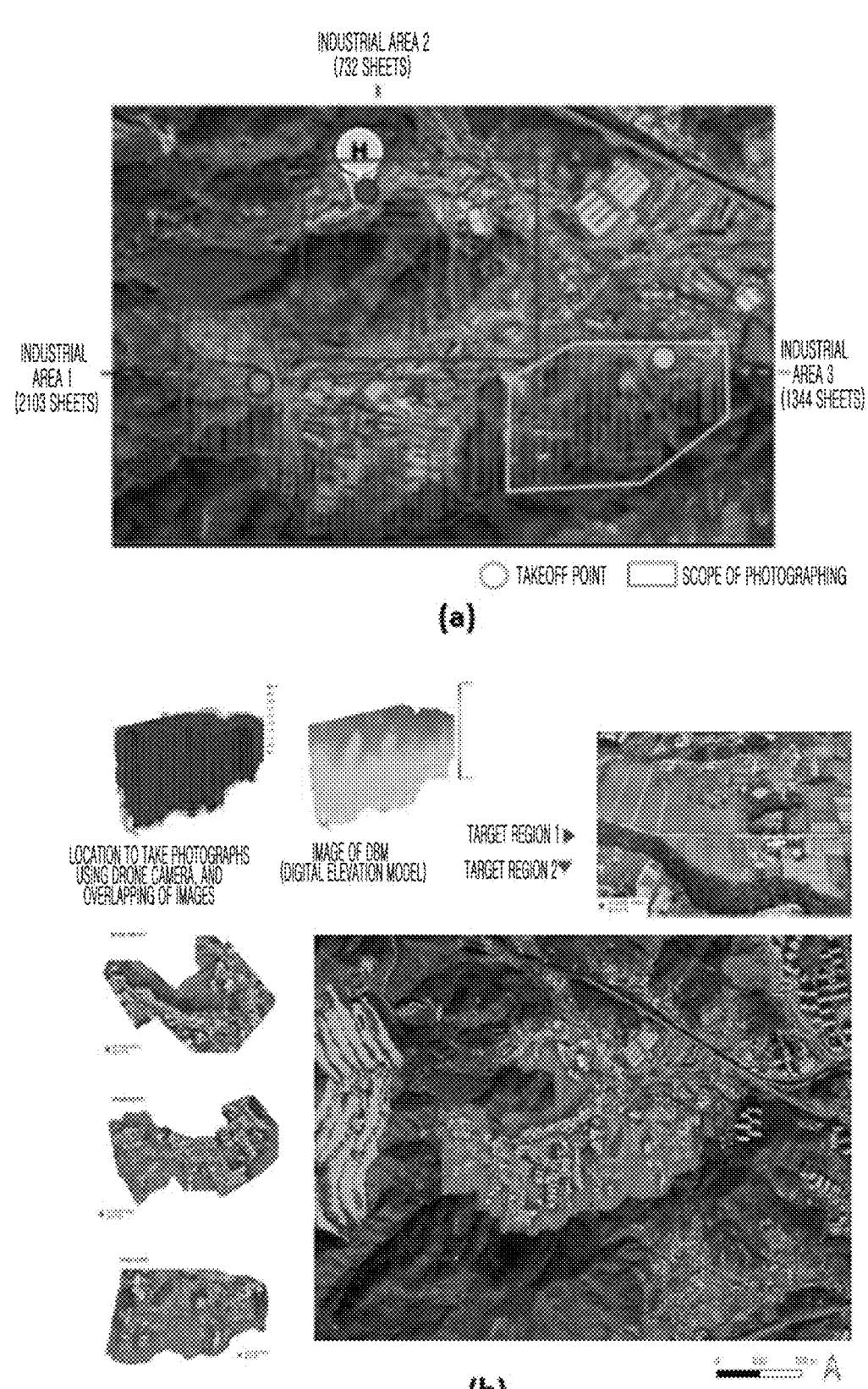
(a)
(b)

【Fig. 10】
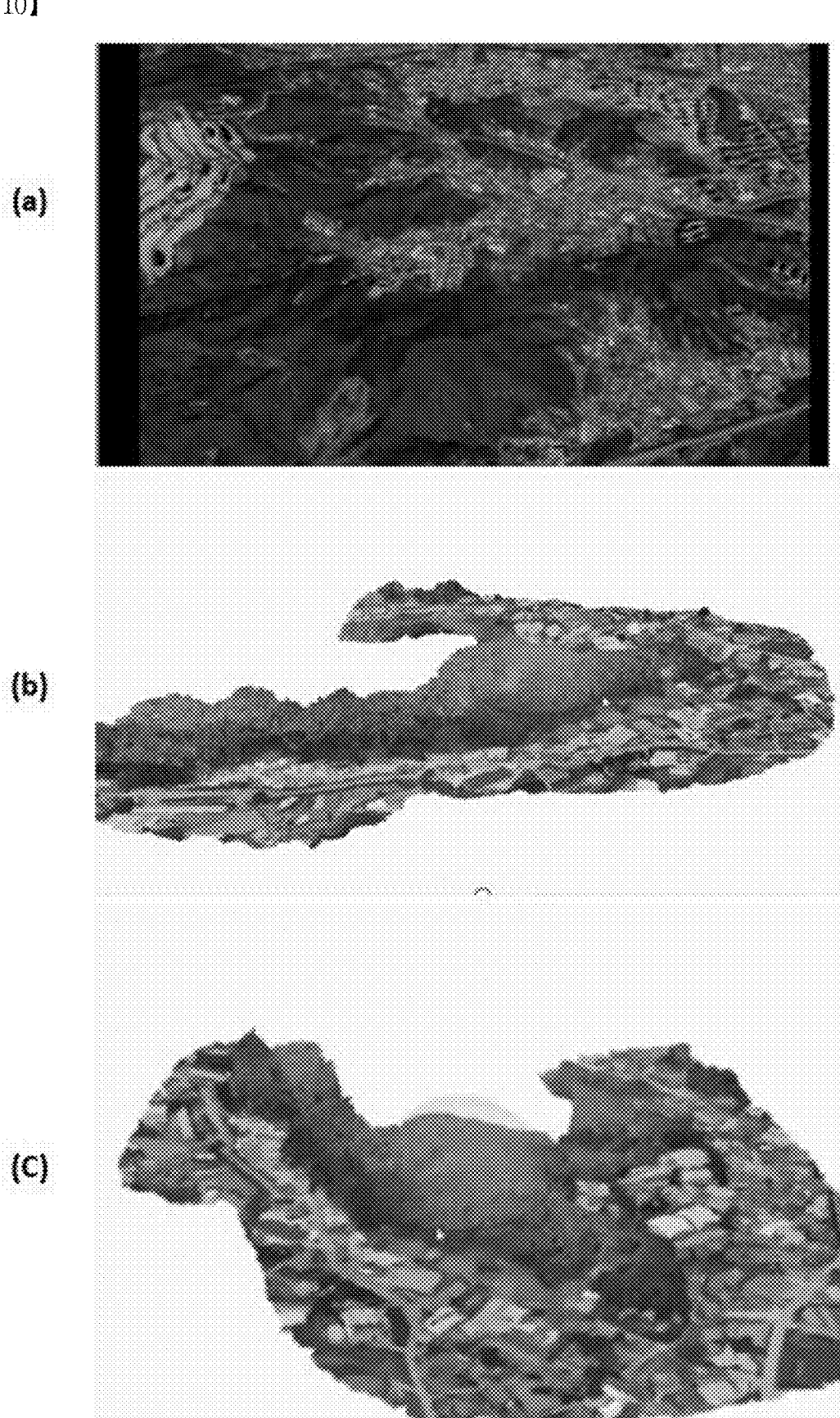

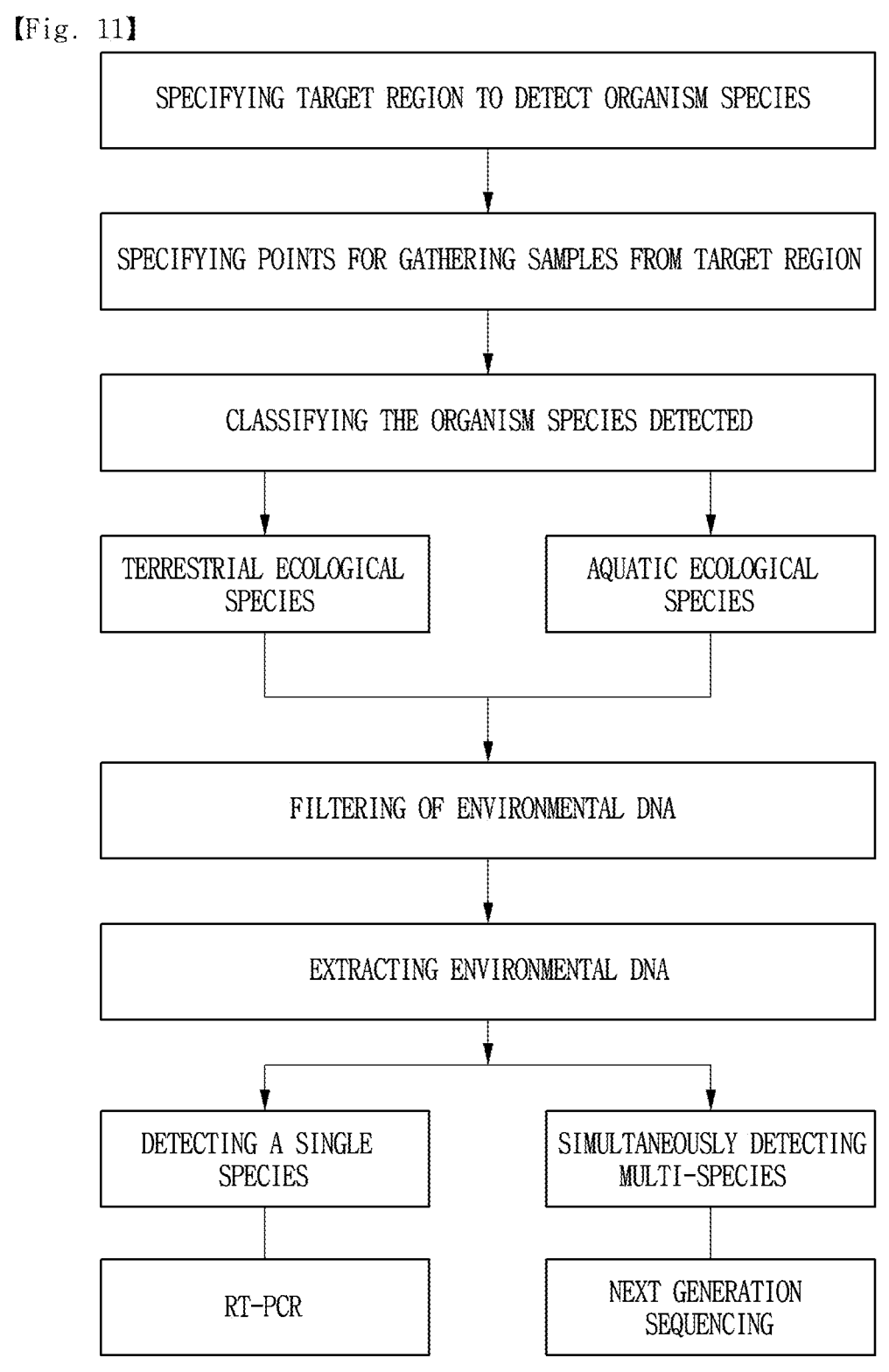

【Fig. 11】

```
┌─────────────────────────────────────────────────────────────┐
│      SPECIFYING TARGET REGION TO DETECT ORGANISM SPECIES      │
└─────────────────────────────────────────────────────────────┘
                              ┊
                              ▼
┌─────────────────────────────────────────────────────────────┐
│    SPECIFYING POINTS FOR GATHERING SAMPLES FROM TARGET REGION │
└─────────────────────────────────────────────────────────────┘
                              ┊
                              ▼
┌─────────────────────────────────────────────────────────────┐
│           CLASSIFYING THE ORGANISM SPECIES DETECTED           │
└─────────────────────────────────────────────────────────────┘
              ┊                               ┊
              ▼                               ▼
┌───────────────────────┐         ┌───────────────────────┐
│  TERRESTRIAL ECOLOGICAL│         │   AQUATIC ECOLOGICAL  │
│        SPECIES         │         │        SPECIES        │
└───────────────────────┘         └───────────────────────┘
              └───────────────┬───────────────┘
                              ▼
┌─────────────────────────────────────────────────────────────┐
│              FILTERING OF ENVIRONMENTAL DNA                   │
└─────────────────────────────────────────────────────────────┘
                              ┊
                              ▼
┌─────────────────────────────────────────────────────────────┐
│              EXTRACTING ENVIRONMENTAL DNA                     │
└─────────────────────────────────────────────────────────────┘
              ┌───────────────┴───────────────┐
              ▼                               ▼
┌───────────────────────┐         ┌───────────────────────┐
│   DETECTING A SINGLE   │         │ SIMULTANEOUSLY DETECTING│
│        SPECIES         │         │      MULTI-SPECIES     │
└───────────────────────┘         └───────────────────────┘
              ┊                               ┊
┌───────────────────────┐         ┌───────────────────────┐
│         RT-PCR         │         │    NEXT GENERATION    │
│                        │         │      SEQUENCING       │
└───────────────────────┘         └───────────────────────┘
```

【Fig. 12】
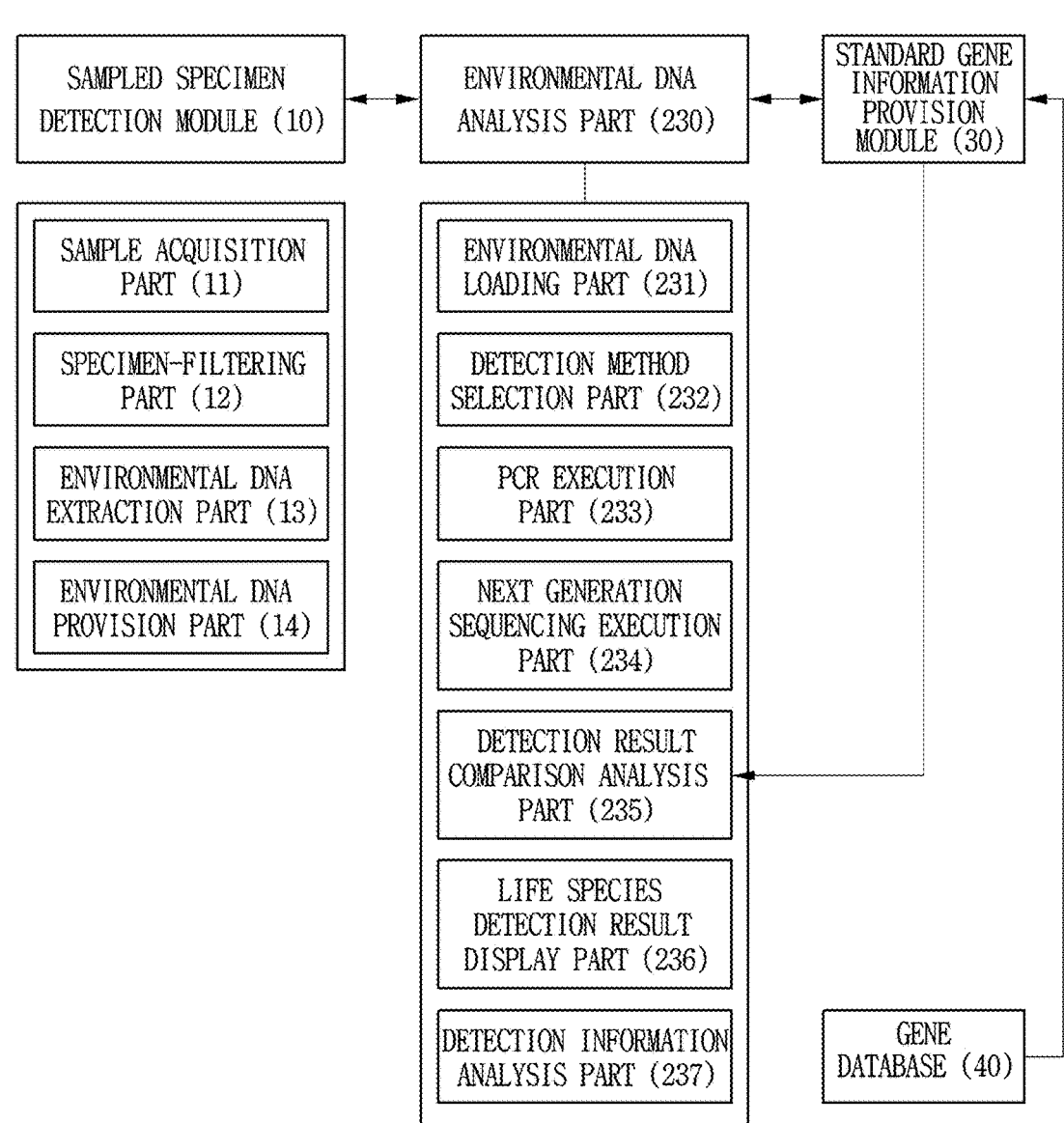

【Fig. 13】
| Primer name | | sequence | size | reference |
|---|---|---|---|---|
| 1 | SusScrofaDF | CAAGCATTCCATTCGTATG | 96bp | PLoS ONE 12(7): e0179282 |
| | SusScrofaDR | CGCATATTTGTATGTTTGTG | | |
| 2 | pigCTR22L | TTCGTATGCAAACCAAAACG | 495bp | J. Environ. Impact Assess. 29(3): 230~238(2020) |
| | pigCTR515H | GCTGATTAGTCATTAGTCC | | |
(a)
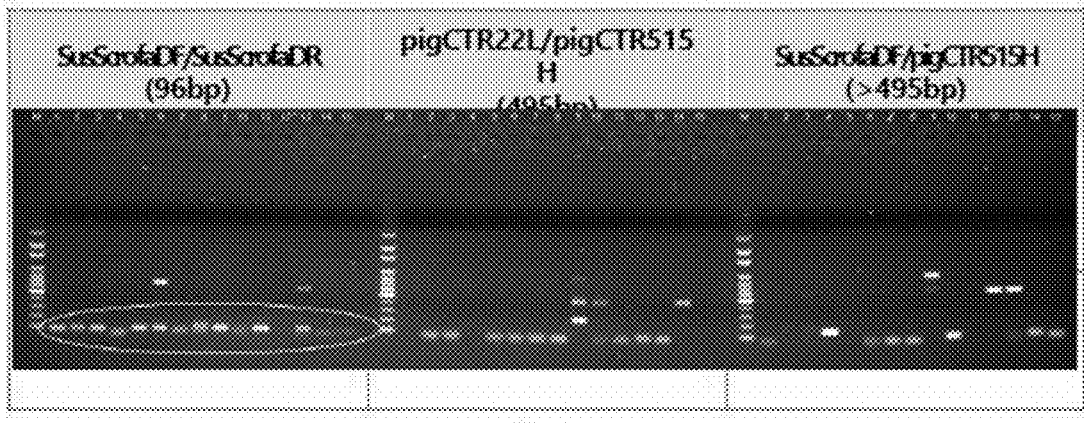
(b)

【Fig. 14】
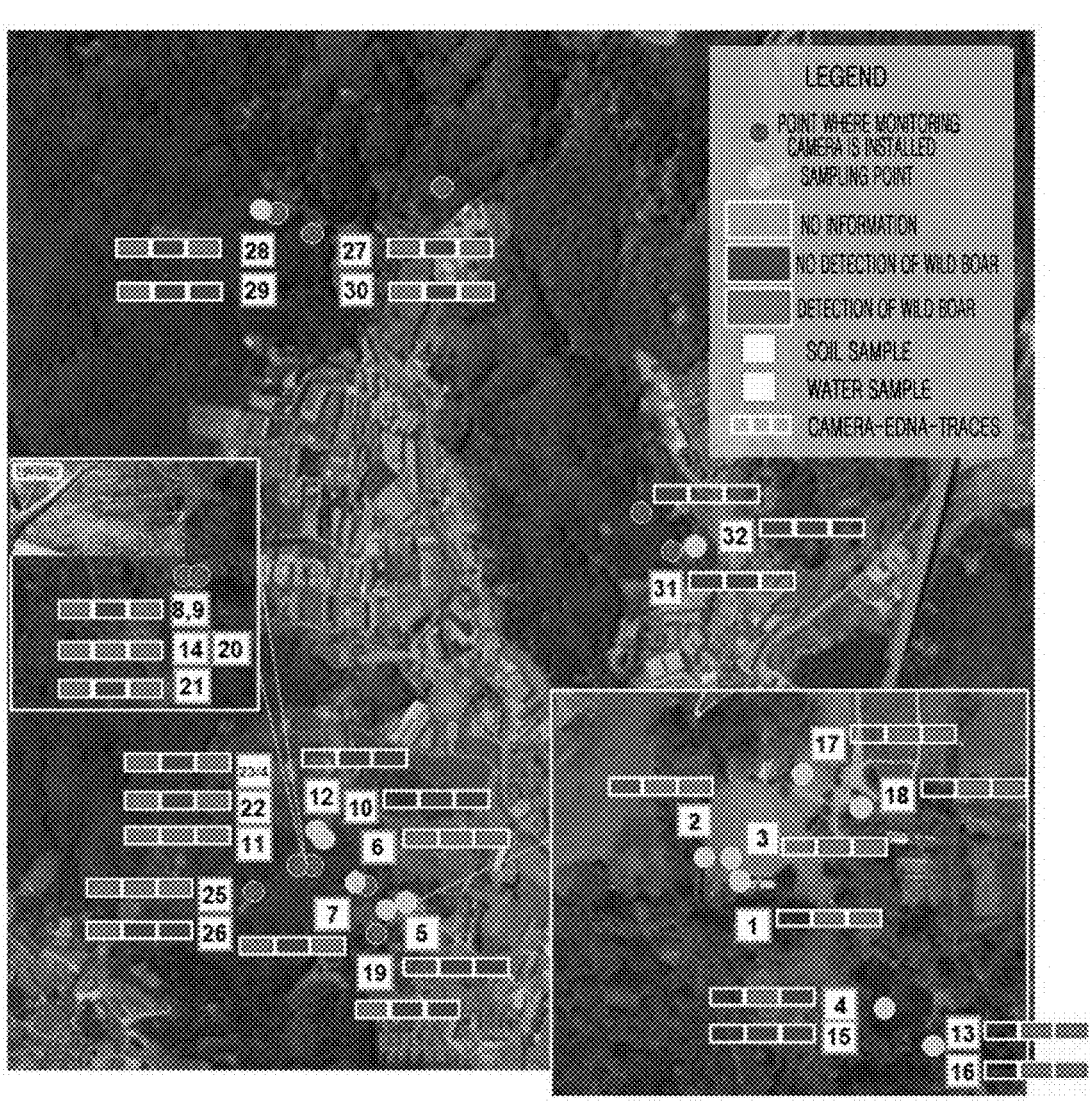

【Fig. 15】
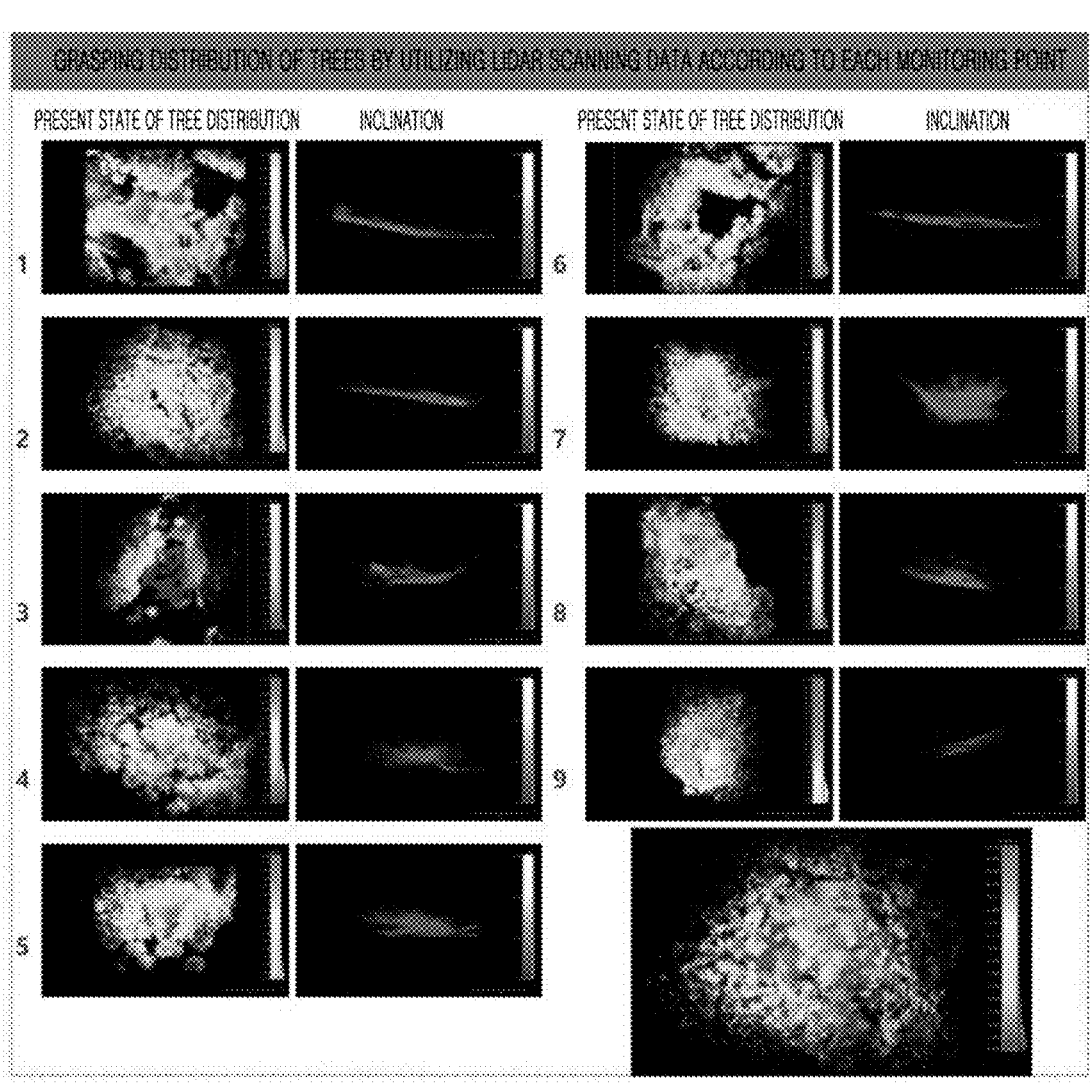

【Fig. 16】
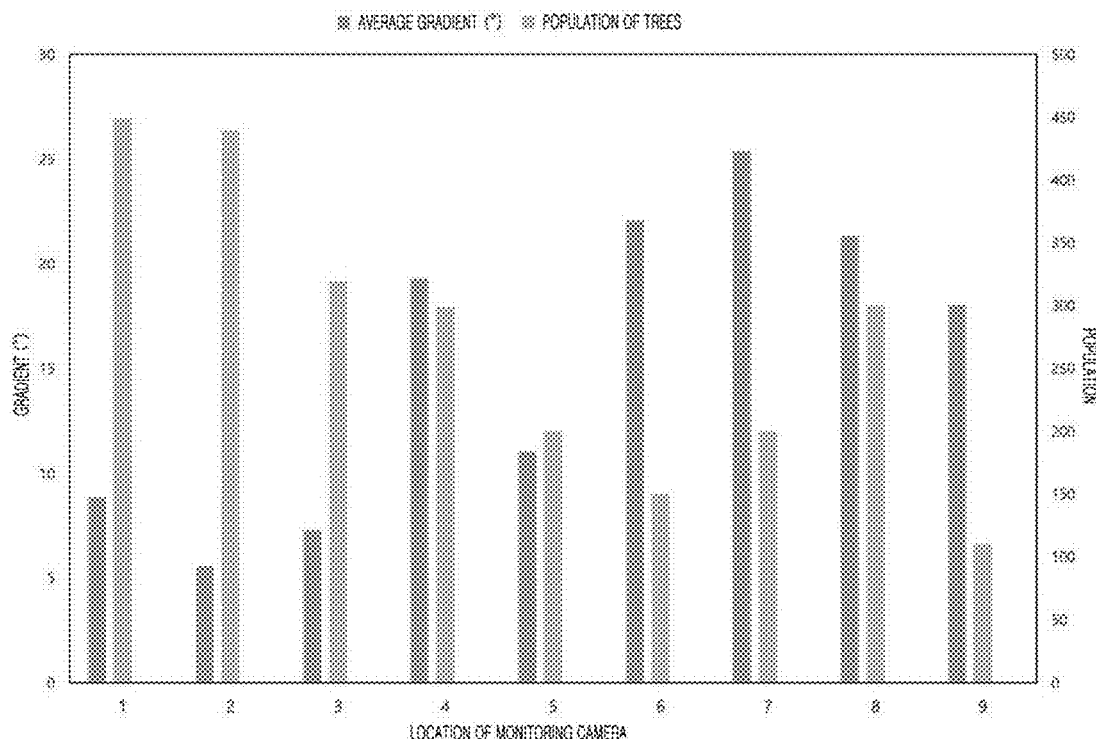

[Fig. 17]

| VARIABLE | DATA NAME | UNIT | DESCRIPTION | SOURCE OF DATA |
|---|---|---|---|---|
|  | APPEARANCE POINT | EXISTENCE OR ABSENCE OF APPEARANCE | ACCORDING TO APPEARANCE POINTS, THE POINTS BEING INDICATED BY NUMERAL VALUES BETWEEN NUMBER 1 AND NUMBER 10 | MONITORING CAMERA, AND ENVIRONMENTAL DNA |
| EXPOSURE LEVEL | DISTANCE FROM RICE FIELD (DIVIDED ACCORDING TO CROPS, SUCH AS BARLEY, RICE, ETC.) | M (METER) | AS THE DISTANCE BECOMES NEAR GRADUALLY, THE EXPOSURE LEVEL BECOMES HIGH. THE NEAREST DISTANCE IS PROVIDED WITH A LARGE VALUE. | PHOTOGRAPHING BY DRONE |
|  | DISTANCE FROM DRY FIELD (DIVIDED ACCORDING TO CROPS, SUCH AS CORN, SWEET POTATOES, ETC.) | M (METER) | AS THE DISTANCE BECOMES NEAR GRADUALLY, AN EXPOSURE LEVEL BECOMES HIGH. THE NEAREST DISTANCE IS PROVIDED WITH A LARGE VALUE. |  |
|  | DISTANCE FROM PINE FOREST | M (METER) | AS THE DISTANCE BECOMES NEAR GRADUALLY, THE EXPOSURE LEVEL BECOMES HIGH. THE NEAREST DISTANCE IS PROVIDED WITH A LARGE VALUE. | PHOTOGRAPHING BY DRONE, FOREST SHAPE MAP (DATABASE OF THE FOREST SERVICE) |
|  | DISTANCE FROM PINUS KORAIENSIS FOREST | M (METER) | AS THE DISTANCE BECOMES NEAR GRADUALLY, THE EXPOSURE LEVEL BECOMES HIGH. THE NEAREST DISTANCE IS PROVIDED WITH A LARGE VALUE. |  |
|  | TWI | REAL NUMBER HAVING VALUE OF FROM ~ TO ~ | AS MOISTURE CONTENT BECOMES HIGH GRADUALLY, THE EXPOSURE LEVEL BECOMES HIGH. | PHOTOGRAPHING BY DRONE |
| SENSITIVITY LEVEL | DISTANCE FROM RESIDENTIAL AREA | M (METER) | AS THE DISTANCE BECOMES NEAR GRADUALLY, THE SENSITIVITY LEVEL BECOMES HIGH. THE NEAREST DISTANCE IS PROVIDED WITH A LARGE VALUE. | PHOTOGRAPHING BY DRONE |
|  | POPULATION SIZE | NUMBER OF PERSONS | AS THE POPULATION SIZE INCREASES GRADUALLY, THE SENSITIVITY LEVEL BECOMES HIGH. | NATIONAL LAND STATISTIC MAP-BASED DATABASE |
| ADAPTABILITY | DISTANCE FROM ROAD | M (METER) | AS THE DISTANCE FROM A ROAD BECOMES NEAR GRADUALLY, THE ADAPTABILITY BECOMES HIGH. THE NEAREST DISTANCE IS PROVIDED WITH A LARGE VALUE. | PHOTOGRAPHING BY DRONE |
|  | GRADIENT | % | AS AN INCLINATION BECOMES STEEP GRADUALLY, THE ADAPTABILITY BECOMES HIGH. |  |

[Fig. 18]
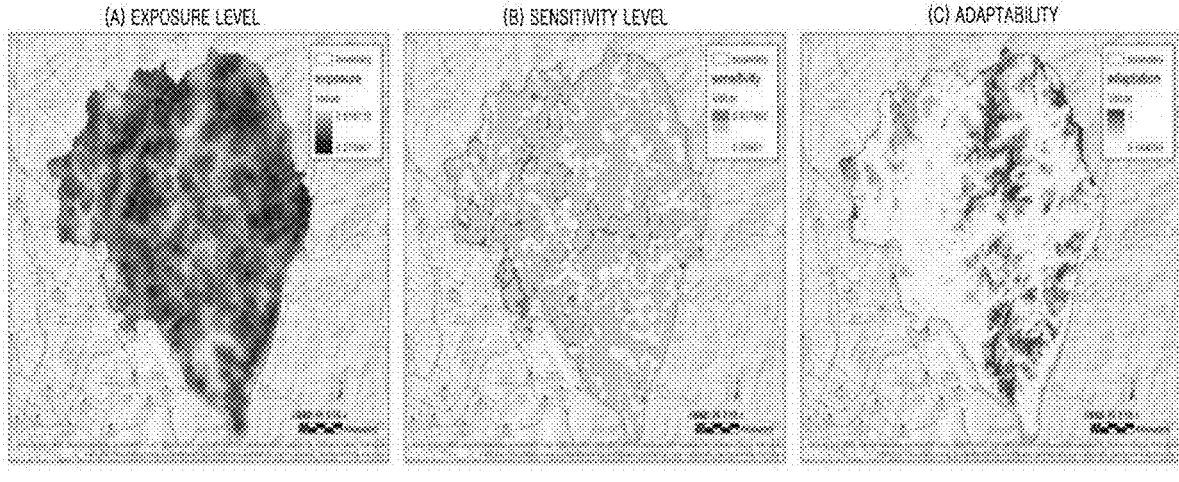

GUIDED FENCE INSTALLATION AREA DERIVATION SYSTEM THROUGH ANALYSIS OF VULNERABILITY TO HARMFUL BIRDS AND ANIMALS, AND GUIDED FENCE INSTALLATION AREA DERIVATION METHOD USING SAME

TECHNICAL FIELD

The present invention relates to a technology capable of efficiently deriving a place to install an induction fence intended for blocking the invasion of harmful birds and animals.

BACKGROUND ART

Recently, according to the occurrence of damage to the crops due to the appearance of harmful wild animals and animal species, damage resulting from Africa Swine Fever, and so on, expenses for the installation of fences have been spent continuously. With respect to a method of installing the fences, the fences have been installed all over a mountain, or in the case of a road, all over the boundary surface of the road.

Also, recently, the Ministry of Land, Infrastructure and Transport, the Ministry of Environment, and the National Institute of Ecology announced on July 2020 that, in order to take measures to cope with roadkill, fences will be installed at places where a lot of road kill occurs, but the Korean government announced on January 2021 that they will devote all their might to take preventive measures against Africa Swine Fever by installing fences over a wide area to prevent the disease from occurring. In addition to this, since wild animals have continuously been doing harm to farmhouses, it is expected that demand for induction fences will continuously increase.

However, in the case of these induction fences, a method of entirely installing the fences throughout the mountain, the boundary surface of the road, or the like has generally been applied, and in the case of farmhouses, since the induction fences have also constructed in such a manner as to be installed all over the boundary surface of a target region to be protected, it is problematic in that installation expenses have been paid excessively.

Furthermore, since fences for protective purposes have generally been installed without any information about the appearance of harmful birds and animals, various inhabitant species, like a sparrow, a magpie, a jay, a brown-eared bulbul, a crow, a jackdaw, a rook, a pheasant, a rufous turtle dove, an elk, a wild boar, a squirrel, a mole, a mouse, and a duck, a house pigeon, and so on, have failed to be divided, so a degree of efficiency of the fences is in a state of not being high.

Thus, a necessity for developing a technology of deriving a place to install an efficient induction fence intended for taking the necessary measures to cope with harmful birds and animals on the basis of data resulting from accurate analysis on the kinds of harmful birds and animals, and frequencies in their appearance concerning a target region has been increasing.

DETAILED DESCRIPTION OF THE INVENTION

Technical Problem

The present invention has been devised for solving the aforesaid problems, and an object of the present invention is to provide a technology capable of calculating an optimal location in such a manner as to calculate an index for vulnerability based on image data, and information resulting from the analysis of environmental DNA with respect to animal species and inhabitant species shown in an area where the appearance of harmful birds and animals occurs, and to match light detection and ranging (LiDAR) scanning data on the basis of the vulnerability index.

Solution for Solving the Problem

With respect to an aspect for solving the aforesaid problems, according to an exemplary embodiment of the present invention, as illustrated in FIG. 1 to FIG. 3, a system of deriving an area to install an induction fence from the analysis of vulnerability to harmful birds and animals may comprise: an image data provision module 100 configured to obtain image data concerning the target region for which the analysis of vulnerability to harmful birds and animal is required, and to transmit the image data to the outside; and a harmful bird and animal-based vulnerability analysis module 200 configured to derive information about the appearance of animal species, and topographical information including information about vegetation canopy structure from the image data transmitted from the image data provision module 100, and to calculate an index for the vulnerability to the harmful birds and animals, thereby determining a location to install the induction fence, wherein the calculation of the vulnerability index to the harmful birds and animals carried out by the harmful bird and animal-based vulnerability analysis module 200 is realized based on information resulting from the analysis of environmental DNA concerning the target region, and information about a land cover map and a gradient concerning the target region on the basis of the image data concerning the target region transmitted from the image data provision module 100.

Furthermore, a method of deriving an area to install an induction fence from the analysis of vulnerability to harmful birds and animals using the system according to the exemplary embodiment of the present invention may be provided, and the method may comprise: a first step in which an image data provision module 100 collects information about whether or not animal species appear in a target region, and appearance trends using a large number of monitoring cameras from the target region for which the analysis of the vulnerability to the harmful birds and animals is required; a second step in which a harmful bird and animal-based vulnerability analysis module 200 collects information on inhabitant species that inhabit the target region by analyzing information about environmental DNA based on a sample sampled in the target region; a third step in which the image data provision module 100 establishes a land cover map and a gradient using image data obtained from photographing by a drone with respect to the target region, and collects information about a feed source of animals; a fourth step in which the image data provision module 100 collects data on the canopy structure of vegetation and a topographical structure from LiDAR scanning data with respect to the target region; and a fifth step in which the harmful bird and animal-based vulnerability analysis module 200 calculates an index for vulnerability based on the information obtained through the first step to the fourth step, and classifies a vulnerable area according to the vulnerability index, thereby selecting a location to install the induction fence.

Effect of the Invention

According to the exemplary embodiment of the present invention, with respect to animal species and inhabitant species shown in an area where the appearance of harmful birds and animals occurs, it is effective to calculate an index for vulnerability based on image data and information resulting from the analysis of environmental DNA, and to calculate an optimal location by matching LiDAR scanning data based on the vulnerability index.

Specifically, according to the present invention, with respect to the installation of an induction fence to prevent approach of the harmful birds and animals to a specific target region, as a derived result concerning a vulnerable area is provided in advance, a plan for installation of the induction fence that is more efficient and economic may be presented.

In particular, in order to derive the vulnerable area to the harmful birds and animals, information on the appearance of animal species, natural and physical space variables based on the fact that it is easy for the animal species to approach, and so on are utilized, so the vulnerable area is derived.

In this case, with respect to the information on the appearance of the animal species, as data on environmental DNA (eDNA), data by a drone, and mobile LiDAR data resulting from the newest technology as well as data on footmarks, feces and so on resulting from a conventional technology are simply utilized, the kind of animal species, vegetation of the target region, a feed source, vegetation canopy structure, and so on (a variable due to the easy approach of animal species may be determined based on the degree of a gradient, the existence or absence of a feed source, the kind of trees, and so on) are grasped together, so a reliable decision for a region to install the induction fence may be made based on information having high accuracy that can be considered to be a basis for the installation of the induction fence.

According to the exemplary embodiment of the present invention described above, with respect to the basis for the installation of the induction fence, the accurate location may be selected based on the vulnerability to harmful birds and animals, so installation expenses can largely be reduced, and effective precautions against the invasion of harmful birds and animals can also be performed.

BRIEF DESCRIPTION OF THE DRAWINGS

FIG. 1 and FIG. 2 are block diagrams illustrating the constitution of a system of deriving an area to install an induction fence from the analysis of vulnerability to harmful birds and animals according to one exemplary embodiment of the present invention.

FIG. 3 is a flow chart illustrating a method to which the present invention based on FIG. 1 and FIG. 2 is applied.

FIG. 4 to FIG. 10 are exemplary views for describing an operation method of the system which derives an area to install an induction fence from the analysis of vulnerability to harmful birds and animals according to the other exemplary embodiments of the present invention.

FIG. 11 is a flow chart illustrating systematic structure for the analysis of environmental deoxyribonucleic acid (DNA), and FIG. 12 illustrates a systematic constitution in which FIG. 11 is embodied.

FIG. 13 illustrates an example concerning a result of the analysis of the environmental DNA according to the present invention, and FIG. 14 is an image on which the result shown in FIG. 13 is indicated.

FIG. 15 to FIG. 18 are conceptual views illustrating an application process for the analysis of a vulnerability index according to the present invention.

MODE FOR CARRYING OUT THE INVENTION

The advantages and features of the present invention, and the method for accomplishing them will be clear with reference to the accompanying drawings and the exemplary embodiments described below in detail. However, the present invention should not be limited to the exemplary embodiments described herein, but may be embodied in the other forms. Rather, the exemplary embodiments introduced herein are provided so that the contents disclosed herein can be thorough and complete, and can fully convey the scope of the present invention to those skilled in the art.

The terms used in the present specification are only intended for describing specific exemplary embodiments and are not intended to limit the present invention. The singular forms are intended to include the plural forms as well, unless the context clearly indicates otherwise. In the present specification, the terms, such as "comprise" or "have" and so on, are intended to show that there are features, numerals, steps, operations, constituent elements, component parts, or a combination thereof described herein, and should not be construed as previously excluding a possibility of the existence or addition of one or more other features, or numerals, steps, operations, constituent elements, component parts, or a combination thereof.

Unless the definitions are indicated otherwise, all the terms used herein including technical or scientific terms have the same meanings as those that are commonly understood to those having ordinary skill in the technical field. Also, the terms as generally used and defined in a dictionary should be construed as having meanings corresponding to contextual meanings concerning the relevant technology, and should not be interpreted ideally and excessively as having formal meanings, unless they are clearly defined in the present specification.

FIG. 1 and FIG. 2 are block diagram illustrating the constitution of a system (hereinafter referred to as "the present invention") of deriving an area to install an induction fence from the analysis of vulnerability to harmful birds and animals according to one exemplary embodiment of the present invention. FIG. 3 is a flow chart illustration a method to which the present invention based on FIG. 1 and FIG. 2 is applied.

Referring to FIG. 1 to FIG. 3, the present invention may comprise: an image data provision module 100 configured to obtain image data concerning a target region for which the analysis of vulnerability to harmful birds and animals is required (hereinafter referred to as "the target region"), and to transmit the image data to the outside; and a harmful bird and animal-based vulnerability analysis module 200 configured to derive topographical information including information about the appearance of animal species, and information about vegetation canopy based on the image data transmitted from the image data provision module 100, and to calculate an index for vulnerability to the harmful birds and animals, thereby determining a location to install the induction fence.

In this case, the harmful bird and animal-based vulnerability analysis module 200 may be disposed and installed in an integrated management server 300 in a body, or in a separation type, thereby carrying out the relevant function. The harmful bird and animal-based vulnerability analysis module 200 may derive a result of analysis by being installed in a computer device in which a program is installed, and the integrated management server 300 may function to perform data processing, management, and control by being linked with this computer device, and may have a database applicable to the analysis of information later by making big data with the massive data.

Moreover, an external agency server 400, which comprises a database of an external agency having data required for application of the system, comprises an agency server, such as a database on a statistical map of the national land for collecting map data to select a target region, a database of the Forest Service for collecting a forest shape map concerning trees of the target region, or the like.

Also, the calculation of an index for vulnerability by the harmful bird and animal-based vulnerability analysis module 200 may be carried out based on information about the appearance of animal species, information about the analysis of environmental deoxyribonucleic acid (DNA) concerning the target region, and information about a land cover map and a gradient concerning the target region on the basis of the image data concerning the target region provided by the image date provision module 100.

That is, the present invention may present a plan for efficiently and economically installing the induction fence by providing a result of the derivation of a vulnerable area in advance with respect to installation of the induction fence. In order to derive a vulnerable area to harmful birds and animals, the vulnerable area may be derived in such a manner as to utilize information on the appearance of animal species, and natural and physical space variables due to easy approach of the animal species, and so on.

With respect to this information on the appearance of the animal species, as data on environmental DNA (eDNA), data by a drone, and mobile LiDAR data resulting from the newest technology as well as data on footmarks, feces and so on resulting from a conventional technology are simply utilized, the kind of animal species, vegetation of the target region, a feed source, vegetation canopy structure, and so on are grasped together, information that can be considered to be a basis for the installation of the induction fence may be provided. Moreover, a variable caused by easy approach of the animal species may be determined based on the degree of a gradient, the existence or absence of a feed source, the kind of trees, and so on.

Specifically, the image data provision module 100 functions to receive and transmit the image data concerning the target region. With regard to the constitution therefor, the image data provision module 100 may comprise: a first module 110 configured to receive image data through a monitoring camera installed at the ground of the target region; and a second module 120 configured to provide image data captured in the skies of the target region and received from a pilotless airplane; and a third module 130 configured to receive and provide light detection and ranging (LiDAR) scanning data concerning the target region.

The first module 110 may comprise a monitoring camera and a radio communication device which may take pictures for environmental images of the outside during predetermined time and may transmit data of the images captured, respectively. Most of the image data captured by the first module 110 are video data, and the data become basic materials to derive information about whether or not animals appear in the relevant area, and a frequency in appearance of the animals.

The second module 120 may provide the image data resulting from aerial photographing with respect to the target region, and comprise the camera module installed at the pilotless airplane (for instance, a drone), and the radio communication device configured to transmit the image data captured. Based on the image data received through the second module 120, the information on a land cover map and a gradient concerning the target region may be derived, and information about a feed source of the animal species may be calculated.

The third module 139 may comprise a LIDAR scanner and a radio communication device so as to receive the LiDAR scanning data concerning the target region. The LiDAR scanner for the target region shows a concept that covers a device intended for obtaining the scanning information about this target region, and mobile LiDAR scanner (MLS, namely handheld LiDAR system) equipment or terrestrial LiDAR scanner (TLS) equipment, and mobile LiDAR scanner (MLS, namely handheld LiDAR system) equipment may be applied thereto. According to a preferable exemplary embodiment of the present invention, the mobile LiDAR scanner (MLS, handed LiDAR system) equipment is disposed in such a manner that data concerning the relevant target region can be obtained, and the mobile LiDAR scanner (MLS) may carry out scanning while moving centering around a target so that a form of the target can be outputted as point cloud data completely.

Based on the image data concerning the target region provided by the image data provision module 100, the harmful bird and animal-based vulnerability analysis module 200 may calculate an index for vulnerability to the harmful birds and animals.

For this, the harmful bird and animal-based vulnerability analysis module 200 may comprise: an animal species appearance information derivation part 210 configured to derive data on whether or not animal species appear in images, and a frequency in appearance by receiving the image data transmitted from the first module 110; a detailed information derivation part 220 configured to derive a land cover map and a gradient concerning the target region and to calculate information about a feed source of the animal species using the image data provided by the second module 120; an environmental DNA analysis part 230 configured to derive information about inhabitant species that inhabit the target region using information on environmental DNA collected in the target region; and a topographical information derivation part 240 configured to derive information about vegetation canopy structure, and a topographical structure from analyzing the LiDAR scanning data provided by the third module 130.

Furthermore, the harmful bird and animal-based vulnerability analysis module 200 may further comprise a vulnerability index calculation part 250 configured to calculate a vulnerability index concerning the target region by calculating indices for an exposure level, a sensibility level, and adaptability in such a manner as to provide each variable with a weighted value, the variables being based on data concerning a first piece of information including the information about the frequency in appearance derived by the animal species appearance information derivation part 210, a second piece of information including the information about the land cover map and the gradient, and the information about the feed source derived by the detailed information derivation part 220, and a third piece of information including the information on the inhabitant species derived by the environmental DNA analysis part 230.

Furthermore, the harmful bird and animal-based vulnerability analysis module 200 may further comprise an induction fence installation location determination part 260 configured to calculate and provide an optimal location to install the induction fence aiming at harmful birds and animals by deriving a zone in the target region in which a vulnerability index showing high vulnerability to the harmful birds and animals is calculated from the information about the vegetation canopy structure and the topographical structure provided by the topographical information derivation part 240.

In this case, the vulnerability index calculation part 250 may calculate the vulnerability index through a program of realizing the following {Formula 1}:

$$\text{Vulnerability Index} = \qquad\qquad \{\text{Formula 1}\}$$
$$\text{Exposure Level} + \text{Sensitivity Level} - \text{Adaptability}$$

According to the application of the present invention descried above, a method, which derives the location to install the induction fence using the system of deriving the area to install the induction fence from the analysis of the vulnerability to the harmful birds and animals, may be carried out in order below as shown in the flow chart illustrated in FIG. 3.

Referring to FIG. 3, the method, which deriving the location to install the induction fence using the system of deriving the area to install the induction fence from the analysis of vulnerability to harmful birds and animals, may comprise: a first step in which the image data provision module 100 collects information about whether or not animal species appear in a target region, and information about appearance trends using a large number of monitoring cameras with respect to the target region for which the analysis of vulnerability to the harmful birds and animals is required; a second step in which the harmful bird and animal-based vulnerability analysis module 200 analyzes information about environmental DNA based on a sample sampled at the target region, thereby collecting information about animal species that inhabit the target region; a third step in which the image data provision module 100 establishes a land cover map and a gradient based on image data obtained from photographing by a drone with respect to the target region, and collects information about a feed source of animals; a fourth step in which the image data provision module 100 collects data on the canopy structure of vegetation, and a topographical structure based on LiDAR scanning data with respect to the target region; and a fifth step in which the harmful bird and animal-based vulnerability analysis module 200 calculates an index for vulnerability based on the information of the first step to the fourth step, and classifies a vulnerable area according to the vulnerability index, thereby selecting a location to install the induction fence.

In this case, there is no doubt that the first step to the fourth step may be realized simultaneously or successively.

Hereinafter, an example to which the method of deriving a location to install the induction fence using the system of deriving the area to install the induction fence from the analysis of the vulnerability to the harmful birds and animals is applied, an exemplary embodiment to which the present invention is applied is described in detail.

1. Selection of Target Region

FIG. 4 shows an example for selecting a target region for which the analysis of vulnerability to harmful birds and animals is required, and (A) thereof exemplifies selecting Namyangju-si, Gyeonggi-do in Korea as a vulnerable area to the harmful birds and animals using a map showing damage from harmful wild animals on the basis of natural environments in the metropolitan area. (B) of FIG. 4 shows deriving, by the external agency server 400, information on the distribution of civil petitions against the appearance of harmful birds and animals concerning the selected target region (Namyangju-si, Gyeonggi-do). These materials are derived by the external agency server 400 shown in FIG. 1, and are transmitted to the integrated management server 300, and the integrated management server 300 enables the harmful bird and animal-based vulnerability analysis module 200 to carry out analysis on the relevant target region.

FIG. 5 and FIG. 6 show that expected vulnerable points to the harmful birds and animals are primarily divided according to the existence or absence of a civil petition using a map for the whole area of the target region derived by the external agency server 400 and transmitted to the integrated management server 300, wherein the expected points between Number 1 and Number 14 are selected preferentially, and analysis on vulnerability indices therefor is carried out. According to another exemplary embodiment of the present invention, the description is based on carrying out the analysis of vulnerability concerning the area of Number 4.

2. Collecting Information about Whether or not Animal Species Appear in Target Region, and Appearance Trends (A) of FIG. 7 is a view indicating, from specific places in the target region, locations where monitoring cameras are installed, and (B) illustrates the image of wild animals exposed to the relevant monitoring camera. FIG. 8 shows deriving stop images concerning the appearance of wild animals exposed to the monitoring cameras installed in the target region.

According to the present invention, the animal species appearance information derivation part 210 stated in the section regarding FIG. 2 above counts whether harmful birds and animals appear or not based on movements shown in these images concerning the appearance of the wild animals, and specifies the kind of wild animals through analysis of the images, thereby making data.

3. Establishing Land Cover Map and Gradient Using Image Data Captured by Drone

Also, according to the present invention, based on images obtained by aerial photographing concerning the target region, the detailed land cover map and gradient may be established, and a feed source may be grasped.

FIG. 9 illustrates dividing the target region into Target Region 1 and Target Region 2 in order to perform image photographing by a drone with respect to the target region, and shows a result of the photographing by the drone. FIG. 10 successively illustrates results occurring from performing the analysis of three-dimensional (3D) modeling space.

Based on the images captured by the drone as described above, the recent land cover state may be confirmed, and as a change in land cover throughout the target region is considered in detail, information about a land cover map may be derived, and information about the feed sources of animals based on information about gradients and the kind of land covers resulting from analysis of the three-dimensional modeling space may also be derived. (This function may be carried out by the detailed information derivation part 220 stated in the section concerning FIG. 2 above.)

4. Collecting Information about Inhabitant Species Inhabiting Target Region by Analyzing Information about Environmental DNA The accurate analysis of harmful birds and animals, wild animals, existing in the target region may be trusted for the first time only after an investigation and analysis concerning an inhabitant species that isn't being found by the aforesaid analysis concerning the image data are performed. Thus, according to the present invention, in order to analyze information on wild animals that aren't found by the analysis of the image data, but inhabit the target region, the analysis of environmental DNA concerning the target region may be carried out.

This analysis of the environmental DNA is carried out by the environmental DNA analysis part 230 of the harmful bird and animal-based vulnerability analysis module 200 shown in FIG. 2, or the analysis of a result derived by incidental equipment, such as equipment of gathering a specimen for the analysis, filter equipment, and so on, is carried out thereby.

The analysis of the environmental DNA corresponds to a technology of classifying a target species by comparing the domain of a gene owned by an organism and clearly distinguished from the other species in such a manner as to utilize the segments of DNA of living animals that remain in an environment.

According to one example concerning a process of this analysis on the environmental DNA, the process may be carried out through a step of gathering a sampled specimen (specimens, water samples, and so on) from the target region in order to detect the species of organisms that live in the target region, a step of collecting environmental DNA from the gathered specimen by performing filtering using a filter module, a step of extracting only the environmental DNA existing in a filter by performing centrifugation with respect to the filter which filters out impurities from the specimen, a step of performing a real-time polymerase chain reaction (PCR) or next generation sequencing in order to detect the organism species with respect to the environmental DNA extracted, and a step of deriving a result of detection of the organism species by comparing a result caused by performing said step with data in a database for genes.

FIG. 12 illustrates systematic structure for carrying out the function of the environmental DNA analysis part 130 according to the present invention.

As illustrated in FIG. 12, in order to perform the analysis of environmental DNA, a constitution in which the environmental DNA analysis part 230 is included is configured as described below.

A sampled specimen detection module 10, which is configured to gather water or soil samples from the target region in order to detect organism species, to store up information thereabout, and to extract the environmental DNA from the specimen, thereby providing it, has the environmental DNA analysis part 230 configured to select one amplification analysis method for the sample from a real-time PCR or next generation sequencing according to the detection purpose of a single species or multi-species by loading the environmental DNA provided by the sampled specimen detection module 10, and to derive a result of the detection of organism species in the target region in comparison with information on a standard gene.

Also, the sampled specimen detection module 10 may comprise: a specimen acquisition part 11 configured to gather, store up, and classify the specimen; a specimen-filtering part 12 configured to filter off impurities from environmental DNA contained in the specimen through a filter module by gathering a portion of the specimen provided by the sampled specimen acquisition part 11; an environmental DNA extraction part 13 configured to extract and separate only environmental DNA remaining in the filter; and an environmental DNA provision part 14 configured to provide the environmental DNA analysis part 230 with the environmental DNA extracted by the environmental DNA extraction part 13.

That is, the sampled specimen acquisition part 11 may be composed of a storing module configured to store up a water sample gathered from the outside, and may have a constitution of the specimen-filtering part 12 having a built-in filter module, and realized in a constitution of filtering out impurities from the sampled specimen injected by a motor and an injector using a filter. The environmental DNA extraction part 13, which is a constitution comprising a centrifuge, may be configured to extract only environmental DNA by performing centrifugation with respect to the filter, and may also be configured to provide, via the environmental DNA provision part 14 comprising an automated loading unit or a transferring unit, the environmental DNA analysis part 230 with the environmental DNA extracted by the environmental DNA extraction part 13.

Also, the environmental DNA analysis part 230 may function to select one amplification analysis method for the sample from a real-time PCR or next generation sequencing according to the detection purpose of a single species or multi-species by loading the environmental DNA provided by the sampled specimen detection module 10, and to derive a result of the detection of organism species in the target region in comparison with the information on the standard gene.

For this, the environment DNA analysis part 230 may comprise: an environmental DNA loading part 231 configured to classify and store up the environmental DNA provided by the environmental DNA provision part 14; a detection method selection part 232 configured to select organism species for which analysis on the loaded environmental DNA is required, and to determine an analysis method according to the selection; a PCR execution part 233 configured to perform detection of the single species by establishing a primer for a specific species and carrying out a real-time PCR in order to detect the single species for detection of the specific target species from the extracted environmental DNA in the case of the single species according to the analysis method selected by the detection method selection part 232; and a next generation sequencing execution part 234 configured to execute a process of next generation sequencing in order to simultaneously detect various species of a specific classification group from the extracted environmental DNA in the case of detection of the multi-species according to the analysis method selected by the detection method selection part 232.

That is, with respect to the system according to the present invention, metabarcoding, which is used to investigate a biota existing in an environment in such a manner as to amplify specific sequences existing in every species, to then carry out sequencing using next generation sequencing concerning the sequences, and to fix affiliated groups or names of the species in terms of taxonomy by utilizing a basic local alignment search tool (BLAST) concerning segments of the base sequences of the majority species, may be used to identify the base sequences and species in such a manner as to perform the next generation sequencing using general primers, such as MiMammal in the case of mammals, MiFish in the case of fish, and so on.

Furthermore, with respect to the specific species, a species-specific primer may be used, and in order to compare the detection rates of DNA among species, a real-time polymerase chain reaction (RT-PCR) may be used.

Additionally, the system according to the present invention may comprise a detection result comparison analysis part 235 configured to derive a result of the detection of organism species by comparing information provided by the standard gene information provision module 30 with the analysis result rendered by the PCR execution part 233 or the next generation sequencing execution part 234.

Furthermore, the result rendered by the detection result comparison analysis part 235 may be displayed through a detection result display part 236, and a communication part configured to transmit the relevant result to the outside may further be added.

Also, a detection result analysis part 237 may further be included, wherein the detection result analysis part 237 may function to divide the rate and kind of an ecospecies appearing newly by comparing the analyzed detection result with the existing result, to perform a special genetic analysis therefor, or to update the detection result in comparison with external analysis data.

Also, with respect to a comparative process of genetic information provided by the standard gene information provision module 30 which provides the environmental DNA analysis part 230 with information on the standard gene of a terrestrial organism or an aquatic organism, the analysis of basic sequence and the confirmation of a species list may be realized in a comparative method on the basis of a genetic information data on the existing organism species using a fast-all (FASTA) program.

FIG. 13, which illustrates an exemplary result of this analysis on the environmental DNA, illustrates a result of the confirmation of inhabitant species through a comparison between the result derived through gene analysis by filtering out impurities from the sample gathered from the target region through the filter, and the gene database of a standard animal.

(A) illustrates primer sets of a wild boar, and (B) represents the comparison of results shown by carrying out sequencing with respect to gene segments of the sampled specimen.

That is, in FIG. 13, in order to confirm the detection of a species of the wild boar by utilizing eDNA, three primers are used, so the results are derived in such a manner as to carry out the detection of non-confirmed inhabitant species existing in the target region.

When an experiment was carried out using a set of Primer 1 (96 bp), the specimens of Number 1, Number 2, Number 3, Number 5, Number 6, Number 8, Number 9, Number 11, and Number 12 were amplified, and when the analysis of the basic sequences (sequencing) was carried out, wild boars were confirmed on the basis of the database.

When an experiment was carried out using a set of Primer 2 (495 bp), amplification was realized from the specimens of Number 10 and Number 14.

In the case of a set of Primer 3 (mixing of Primer 1 and Primer 2>495 bp), although amplification was realized, a bacteria species was found, so it could be presumed that there was no DNA related with a wild boar over 500 bp in the sample of the eDNA.

FIG. 14 is an image illustrating a result of the detection of environmental DNA concerning the target region applied into another exemplary embodiment of the present invention.

In the case of FIG. 14, points where monitoring cameras for the target region were installed, and points where specimens were sampled were indicated, and in the relevant sampled specimens, areas where wild boars were detected were indicated in red. With respect to the samples, environmental DNA could widely be secured through soil samples and water samples.

Based on this result, since the fact that various animals as well as the wild boars exist can be confirmed by analysis of the environmental DNA, it can be confirmed that there are wild animals that inhabit the target region and aren't confirmed by the monitoring cameras.

5. Collecting Data Concerning Canopy Structure of Vegetation and a Topographical Structure Using LiDAR Data Also, according to the present invention, in order to confirm vulnerability to harmful birds and animals concerning the target region, data concerning the canopy structure of vegetation and a topographical structure may be collected from the LIDAR data (which is performed by the topographical information derivation part 240 via the third module 130 shown in FIG. 2.)

Referring to FIG. 15, with respect to the target region exemplified in FIG. 14, this illustrates a result of the acquisition of LiDAR data concerning the points (12 points) where the monitoring cameras are installed.

With respect to the image data received by the monitoring cameras, information about whether or not animals appear, and frequencies in appearance may be collected in such a manner as to perform the detailed analysis of three-dimensional space, and with respect to the LiDAR scanning data, the present state of the distribution of trees according to each monitoring point of the relevant target region, an average gradient according to each location, and the population of trees may be grasped.

FIG. 16 shows data in which results obtained from the information about the gradients and the population according each location of the monitoring cameras as grasped in FIG. 15 are indicated. Based on these results, it can be confirmed that the population of trees is relatively high in an agricultural region, and the gradients are relatively high in an industrial region.

6. Calculating Vulnerability Index

After this, the vulnerability index calculation part 250 of the harmful bird and animal-based vulnerability analysis module 200 according to the present invention as stated in the section concerning FIG. 2 above may calculate a vulnerability index concerning the target region by calculating indices for an exposure level, a sensitivity level, and adaptability in such a manner to provide each variable with a weighted value, the variables being based on data concerning a first piece of information comprising information on the frequency in appearance derived by the animal species appearance information derivation part 210, a second piece of information comprising information on the land cover map and the gradient, and feed information derived by the detailed information derivation part 220, and a third piece of information comprising information on the inhabitant species derived by the environmental DNA analysis part 230.

This process of calculating the vulnerability index may be carried out by the vulnerability index calculation part 250 of the harmful bird and animal-based vulnerability analysis module 200 shown in FIG. 2.

In this case, the vulnerability index calculation part 250 may calculate the vulnerability index using a program of realizing {Formula 1} below:

$$\text{Vulnerability Index} = \qquad\qquad \{\text{Formula 1}\}$$
$$\text{Exposure Level} + \text{Sensitivity Level} - \text{Adaptability}$$

FIG. 17 illustrates data and a unit for calculating the vulnerability index, and information about a degree of the weighted value which is provided.

That is, in order to derive the vulnerability index concerning the target region, the vulnerability index results from subtracting a value of "the adaptability" from the sum of values of "the exposure level" and "the sensitivity level."

The exposure level represents a degree of exposure to the relevant animal species. For example, as a distance from a rice field is near gradually, the exposure level to the animals is determined to be high. That is, a probability that the animals will appear becomes higher.

With respect to the sensitivity level, it is determined based on a degree sensitive to people. That is, as the number of population increases gradually, the sensitivity level increases. That is, when an animal appears, an area where many people exist may be considered to be a vulnerable area.

With respect to the adaptability, it is determined based on the degree of people' ability to adapt themselves to damage caused by animal species. As the adaptability increases gradually, the vulnerability index decreases. That is, it can be considered that as a gradient becomes high gradually, it is difficult for the animal species to approach, and as a distance from a road becomes reduces gradually, the appearance of animals decreases.

As the result thereof, the calculation of indices for the exposure level, the sensitivity level, and the adaptability may be realized by a programed constitution on the basis of provision of the weighted value, and the data.

FIG. 18 illustrates a result showing that an exposure level, a sensitivity level, and adaptability are indicated in a map for the target region.

As the result thereof, as the exposure level and the sensitivity level become high gradually, the relevant points may be regarded as being vulnerable to animal species, and in order to recover this, the adaptability should increase. Substantially, since it may be difficult to raise altitude or to build a road, a method, such as the installation of a fence and so on, may be one method.

As described above, lastly determining a location to install the induction fence by calculating the vulnerability index concerning the target region may be selected and presented based on a location showing the highest vulnerability index (induction fence installation location determination part 260 shown in FIG. 2.)

In this case, with respect to the information on the appearance of animal species, as data on environmental DNA (eDNA), data obtained by a drone, and mobile LiDAR data resulting from the newest technology as well as data on footprints, feces and so on resulting from a conventional technology are utilized, the kind of animal species, vegetation concerning the target region, a feed source, canopy structure, and so on (a variable due to the easy approach of animal species may be determined by the degree of an inclination, the existence or absence of a feed source, the kind of trees, and so on) are grasped together, so a reliable decision for an area to install the induction fence may be made based on information having high accuracy that can be considered to be a basis for the installation of the induction fence.

In particular, with respect to the basis for the installation of the induction fence, the accurate location may be selected based on the vulnerability to harmful birds and animals, so installation expenses can largely be reduced, and effective precautions against the invasion of harmful birds and animals can also be performed.

The functional constitutions and execution movements applied to the aforesaid system according to the present invention may be represented by functional block constitutions, and various processing steps. These functional block constitutions may be embodied by hardware or/and software constitutions in diverse numbers which execute special functions. For instance, the present invention may adopt integrated circuit constitutions, such as a memory, processing, logic, look-up table, and so on, which can execute various functions using the control of one or more microprocessors, or the other controllers.

As described above, although the technical ideas of the present invention are specifically described based on the preferable exemplary embodiments, the preferable exemplary embodiments are intended to provide the description thereof, and have no intention of limiting them. Accordingly, it is to be understood that various exemplary embodiments can be made by those having ordinary skill in the art based on a combination of the exemplary embodiments according to the present invention within the scope of the technical ideas of the present invention.

What is claimed is:

1. A system of deriving an area to install an induction fence from an analysis of vulnerability of a target region for installing the induction fence, the system comprising:

an image data provision module configured to obtain image data of the target region for which the analysis of vulnerability to harmful birds and animal, and to transmit the image data to a harmful bird and animal-based vulnerability analysis module; and the harmful bird and animal-based vulnerability analysis module configured to derive an appearance information of animal species, and topographical information of vegetation canopy structure from the image data transmitted from the image data provision module, and to calculate a vulnerability index to the harmful birds and animals, wherein the calculation of the vulnerability index to the harmful birds and animals carried out by the bird and animal-based vulnerability analysis module is realized based on information resulting from an analysis of environmental DNA of the target region, and a land cover map and a land gradient information of the target region on the basis of the image data of the target region transmitted from the image data provision module.

2. The system of claim 1, wherein the image data provision module comprises:

a first module configured to receive image data captured by monitoring cameras installed on the ground in the target region;

a second module configured to provide image data captured in the skies of the target region and received from a pilotless airplane; and a third module configured to receive and provide light detection and ranging (LIDAR) scanning data of the target region.

3. The system of claim 2, wherein the harmful bird and animal-based vulnerability analysis module comprises:

an animal species appearance information derivation part configured to derive data concerning-whether or not animal species appear in images, and a frequency in appearance by receiving the image data transmitted from the first module;

a detailed information derivation part configured to derive the land cover map and the land gradient information from the image data provided by the second module;

an environmental DNA analysis part configured to derive inhabitant species information that inhabit the target region from an environmental deoxyribonucleic acid (DNA) information collected in the target region; and a topographical information derivation part configured to derive a vegetation canopy structure information, and a topographical structure from analyzing the LiDAR scanning data provided by the third module.

4. The system of claim 3, wherein the harmful bird and animal-based vulnerability analysis module further comprises a vulnerability index calculation part configured to calculate indices for an exposure level, a sensitivity level, and adaptability by providing each variable with a weighted value, the variables being based on data on a first piece of information including a frequency in appearance information derived by the animal species appearance information derivation part, a second piece of information including the land cover map and the land gradient information, and a feed source information derived by the detailed information derivation part, a third piece of information including an inhabitant species information derived by the environmental DNA analysis part.

5. The system of claim 4, wherein the vulnerability index calculation part calculates the vulnerability index through a program of realizing {Formula 1} below:

$$\text{Vulnerability Index} = \qquad \text{\{Formula 1\}}$$
$$\text{Exposure Level} + \text{Sensitivity Level} - \text{Adaptability.}$$

6. The system of claim 5, wherein the harmful bird and animal-based vulnerability analysis module further comprises an induction fence installation location determination part configured to derive a zone in the target region in which high vulnerability to the harmful birds and animals is calculated from the vegetation canopy structure information and the topographical structure provided by the topographical information derivation part.

7. A method of deriving an area to install an induction fence from the analysis of vulnerability to harmful birds and animals, with respect to a method of deriving a location to install an induction fence using the system of deriving the area to install the induction fence from the analysis of the vulnerability to the harmful birds and animals according to claim 5, the method comprising:

a first step in which an image data provision module collects information whether or not animal species appear in a target region, and appearance trends using a large number of monitoring cameras from the target region for which the analysis of the vulnerability to the harmful birds and animals;

a second step in which a harmful bird and animal-based vulnerability analysis module collects inhabitant species information that inhabit the target region by analyzing environmental DNA information based on a sample sampled in the target region;

a third step in which the image data provision module establishes a land cover map and a land gradient using image data obtained from photographing by a drone with respect to the target region, and collects a feed source information of animals;

a fourth step in which the image data provision module collects data on the canopy structure of vegetation and a topographical structure from LiDAR scanning data with respect to the target region; and a fifth step of selecting a location to install the induction fence, by the harmful bird and animal-based vulnerability analysis module, based on calculating the vulnerability index based on the information obtained through the first step to the fourth step, and classifying a vulnerable area according to the vulnerability index.

8. The method of claim 7, wherein the first step to the fourth step are realized simultaneously or successively.

9. The method of claim 8, wherein the fifth step shows that the vulnerability index calculation part calculates the vulnerability index through a program of realizing {Formula 1} below:

$$\text{Vulnerability Index} = \qquad \text{\{Formula 1\}}$$
$$\text{Exposure Level} + \text{Sensitivity Level} - \text{Adaptability.}$$

* * * * *